US007848981B2

(12) United States Patent
Bertogg

(10) Patent No.: US 7,848,981 B2
(45) Date of Patent: Dec. 7, 2010

(54) COMPUTER SYSTEM AND METHOD FOR DETERMINING AN EARTHQUAKE DAMAGE INDEX

(75) Inventor: Martin Bertogg, Zurich (CH)

(73) Assignee: Swiss Reinsurance Company, Zürich (CH)

( * ) Notice: Subject to any disclaimer, the term of this patent is extended or adjusted under 35 U.S.C. 154(b) by 0 days.

(21) Appl. No.: 11/916,825

(22) PCT Filed: Jun. 10, 2005

(86) PCT No.: PCT/CH2005/000324

§ 371 (c)(1),
(2), (4) Date: May 9, 2008

(87) PCT Pub. No.: WO2006/131000

PCT Pub. Date: Dec. 14, 2006

(65) Prior Publication Data

US 2008/0208721 A1 Aug. 28, 2008

(51) Int. Cl.
*G06Q 40/10* (2006.01)
(52) U.S. Cl. .......................................... 705/35
(58) Field of Classification Search ............... 705/35
See application file for complete search history.

(56) References Cited

U.S. PATENT DOCUMENTS

2004/0186753 A1* 9/2004 Kim et al. ................. 705/4

FOREIGN PATENT DOCUMENTS

| JP | 9237262 | 9/1997 |
| JP | 11 211839 | 8/1999 |
| JP | 01 63445 | 8/2001 |

OTHER PUBLICATIONS

Howard Kunreuther, A Tool for Hazard Mitigation, The Journal of Risk and Insurance vol. 41, No. 2 (Jun. 1974) pp. 287-303.*
Howard Kunreuther, Disaster Insurance: A Tool for Hazard Mitigation, Jun. 1974, The Journal of Risk and Insurance, vol. 41, No. 2, pp. 287-303.*
Musson, "Intensity-based seismic risk assessment", Soil Dynamics and Earthquake Engineering, vol. 20, pp. 353-360, XP002341138, 2000.

(Continued)

*Primary Examiner*—James P Trammell
*Assistant Examiner*—Abdul Basit
(74) *Attorney, Agent, or Firm*—Oblon, Spivak, McClelland, Maier & Neustadt, L.L.P.

(57) ABSTRACT

In a computer system and a computer-implemented method for determining a damage index indicative of damage caused by an earthquake to a portfolio of objects associated with a geographical area, local portfolio replacement value indices are stored assigned to object or grid coordinates of the geographical area. For each coordinate having a local portfolio replacement value index assigned to it, a local damage index is calculated from location, depth, and magnitude data related to the earthquake and from the local portfolio replacement value index, using local vulnerability and attenuation parameters. The damage index is calculated by aggregating the local damage indices for the grid coordinates. For any size of the geographical area and for any resolution of the grid, a damage index reflecting the geographical distribution of the portfolio objects can be determined, without need for a network of seismological measurement stations distributed in the geographical area.

3 Claims, 5 Drawing Sheets

OTHER PUBLICATIONS

Takashima, et al., "Monitoring Spatial Distribution of Population and Buildings using DMSP Night-time Imagery and Its Application for Earthquake Damage Assessment", IEEE 2003 International Geoscience and Remote Sensing Symposium, vol. 7 of 7, pp. 2430-2432, XP010703739, 2003.

Yong, et al., "Seismic Hazard and Loss Estimation for Central America", Natural Hazards, vol. 25, pp. 161-175, XP002341139, 2002.

* cited by examiner

COMPUTER SYSTEM AND METHOD FOR DETERMINING AN EARTHQUAKE DAMAGE INDEX

FIELD OF THE INVENTION

The present invention relates to a computer system and a method for determining a damage index indicative of the damage caused by an earthquake. Specifically, the present invention relates to a computer system and a computer-implemented method for determining a damage index indicative of the damage caused by an earthquake to a portfolio of objects associated with a geographical area.

BACKGROUND OF THE INVENTION

An earthquake damage index is used to quantitatively approximate the damage caused by an earthquake to a portfolio of defined objects located in a defined geographical area, such as buildings, bridges, highways, power lines, communication lines, manufacturing plants or power plants based solely on physically measured and publicly available parameters of the earthquake phenomenon itself. An earthquake damage index can be assessed immediately after the earthquake. Defining the earthquake damage index solely on a measured magnitude of the earthquake has the disadvantage that there is no consideration of the portfolio and its geographical distribution of objects. Consequently, an earthquake damage index based solely on the magnitude of the earthquake correlates poorly with the true damage caused to the objects of the portfolio. Particularly, with an increase of the size of the geographical area, the magnitude based damage index shows an increasingly poor correlation with the true damage. Thus other methods use other physical parameters of an earthquake occurrence than magnitude, i.e. earthquake shaking intensity in form of peak ground acceleration or peak ground velocity. Such parameters depict in areas of the world equipped with a dense net of seismograph stations a map of the aerial extent of earthquake shaking intensity rather than only a single point measurement of the magnitude. Combining the aerial extent of earthquake shaking intensity with the distributed portfolio of objects allows for a much better correlation of the thus deducted earthquake damage index with really occurred damages to the portfolio, while not sacrificing the immediateness of applicability after the event as well as transparency to anyone willing to set up the computing procedure. However, owing to the cost of installation and maintenance, an infrastructure with a network of geographically densely distributed seismological measurement stations is currently not available in the majority of countries.

SUMMARY OF THE INVENTION

It is an object of this invention to provide an alternative computer system and an alternative computer-implemented method for determining a damage index indicative of the damage caused by an earthquake to a portfolio of objects associated with a geographical area. In particular, it is an object of the present invention to provide a computer system and a computer-implemented method for determining the damage index with consideration of the geographical distribution of objects. Furthermore, it is an object of the present invention to provide a computer system and a computer-implemented method for determining the damage index without the need for an infrastructure having a network of geographically densely distributed seismological measurement stations.

According to the present invention, these objects are achieved particularly through the features of the independent claims. In addition, further advantageous embodiments follow from the dependent claims and the description.

According to the present invention, the above-mentioned objects are particularly achieved in that, for determining a damage index indicative of the damage caused by an earthquake to a portfolio (or list) of objects associated with a geographical area, local portfolio replacement value indices are stored in a computer assigned to coordinates of the geographical area, for example grid coordinates of the geographical area or object coordinates of the geographical area. This grid can be of any resolution and needs not to be regular in spacing. But in any case each grid point of the portfolio under consideration is geographically localized by a longitude and latitude value. In a variant, no such secondary grid is used, but each object of the portfolio is listed by its own coordinates. For example, portfolio replacement values are associated with the grid coordinates based on geographical data assigned to the portfolio replacement values, and, for each grid coordinate, the local portfolio replacement value index is determined from an aggregation of the portfolio replacement values associated with the grid coordinate. The computer receives location, depth and magnitude data associated with the earthquake. For each (grid or object) coordinate having a local portfolio replacement value index assigned to it, the computer calculates a local damage index from the location, depth and magnitude data and from the local portfolio replacement value index, preferably through application of an attenuation equation. Finally, the computer calculates the damage index by aggregating the local damage indices for the (grid or object) coordinates. Storing local portfolio replacement value indices assigned to (grid or object) coordinates of the geographical area and calculating local damage indices for the (grid or object) coordinates based on location, depth and magnitude data make it possible to determine a damage index that reflects the geographical distribution of the portfolio objects based solely on the input of magnitude, depth and epicenter coordinates. The damage index can be determined for any size of the geographical area and for any resolution of the grid applied to the geographical area, without the need for implementing and maintaining a network of seismological measurement stations distributed in the geographical area. The proposed system and method make it possible to compute the damage index based on magnitude and location parameters from a past earthquake, from an artificial earthquake scenario, and predominately from a earthquake event having occurred recently within the cover period of a structured financial product the payout of which being dependent on the size of the earthquake damage index. The proposed system and method make it possible to add a new form of index measure, a parametric model index, to already existing index measures used for structured financial products. The proposed system and method use a simplified earthquake model approach as a basis for the parametric model index. The proposed system and method make it possible to simplify already existing earthquake models for insurance loss and risk assessment. Specifically, after an event applicable to a particular structured financial product, the proposed method and system make it possible to determine the damage index solely based on magnitude, depth and coordinates of an earthquake, as published by a pre-defined seismological agency.

Preferably, for each (grid or object) coordinate having a local portfolio replacement value index assigned to it, the computer calculates a local shaking intensity value index from the location, depth and magnitude data, and a local mean damage degree index from the local shaking intensity value index. Subsequently, the computer calculates the local damage index from the local mean damage degree index and the local portfolio replacement value index. Calculating local shaking intensity value indices for the (grid or object) coordinates makes it possible to estimate a local earthquake impact without the requirement of seismological measurement stations in the geographical area.

In a further preferred embodiment, for each (grid or object) coordinate having a local portfolio replacement value index assigned to it, the computer calculates the local shaking intensity value index from the location, depth and magnitude data, determines a local vulnerability value, and calculates the local mean damage degree index from the local shaking intensity value index and the local vulnerability value. Calculating the local damage index from a local shaking intensity value index and a local vulnerability value makes it possible to consider local object characteristics of the portfolio for estimating the local earthquake impact.

In yet another preferred embodiment, for each (grid or object) coordinate having a local portfolio replacement value index assigned to it, the computer selects local attenuation parameters and a correction parameter for local subsoil conditions, calculates a distance from the location of the earthquake, and calculates the local shaking intensity value index by applying an attenuation function to the distance, depth and magnitude data using the local attenuation parameters and the correction parameter for local subsoil conditions. The seismological (or earthquake) attenuation function expresses attenuation of the strength of an earthquake as a function of the distance from the location of the epicenter of the earthquake. Calculating the local damage index using an attenuation function and local attenuation parameters (assigned to the grid or object coordinates) makes it possible to consider local geological characteristics for estimating the local earthquake impact.

In an embodiment, local geological characteristics are considered even more in that the computer determines the local attenuation parameters depending on the magnitude and depth of the earthquake.

In addition to a computer system and a computer-implemented method for determining a damage index indicative of the damage caused by an earthquake to a portfolio of objects associated with a geographical area, the present invention also relates to a computer program product including computer program code means for controlling one or more processors of a computer system such that the computer system performs the method, particularly, a computer program product including a computer readable medium containing therein the computer program code means.

Preferably, the computer program product includes computer program code means for controlling the computer such that the computer system and the computer-implemented method for determining the earthquake damage index are applicable to a structured financial product. Specifically, the computer program product includes computer program code means for controlling the computer such that the computer applies the damage index to the structured financial product, for example, such that the computer deducts the damage index from an index of the structured financial product for cases where the damage index exceeds a defined threshold value.

The proposed system and method make it possible for anyone to assess the earthquake damage index right after an earthquake event (or for any conceived earthquake) defined only by magnitude, depth and coordinates. The computer program product can be distributed in an electronic format in parallel with other supporting information for the structured financial product. Thus the proposed system and method provide full transparency to investors of a structured financial product based on the damage index by making it possible for the investors to perform on their own pre- and/or post-assessments based on publicly available data.

BRIEF DESCRIPTION OF THE DRAWINGS

The present invention will be explained in more detail, by way of example, with reference to the drawings in which.

DETAILED DESCRIPTION OF THE PREFERRED EMBODIMENTS

Figure 1:
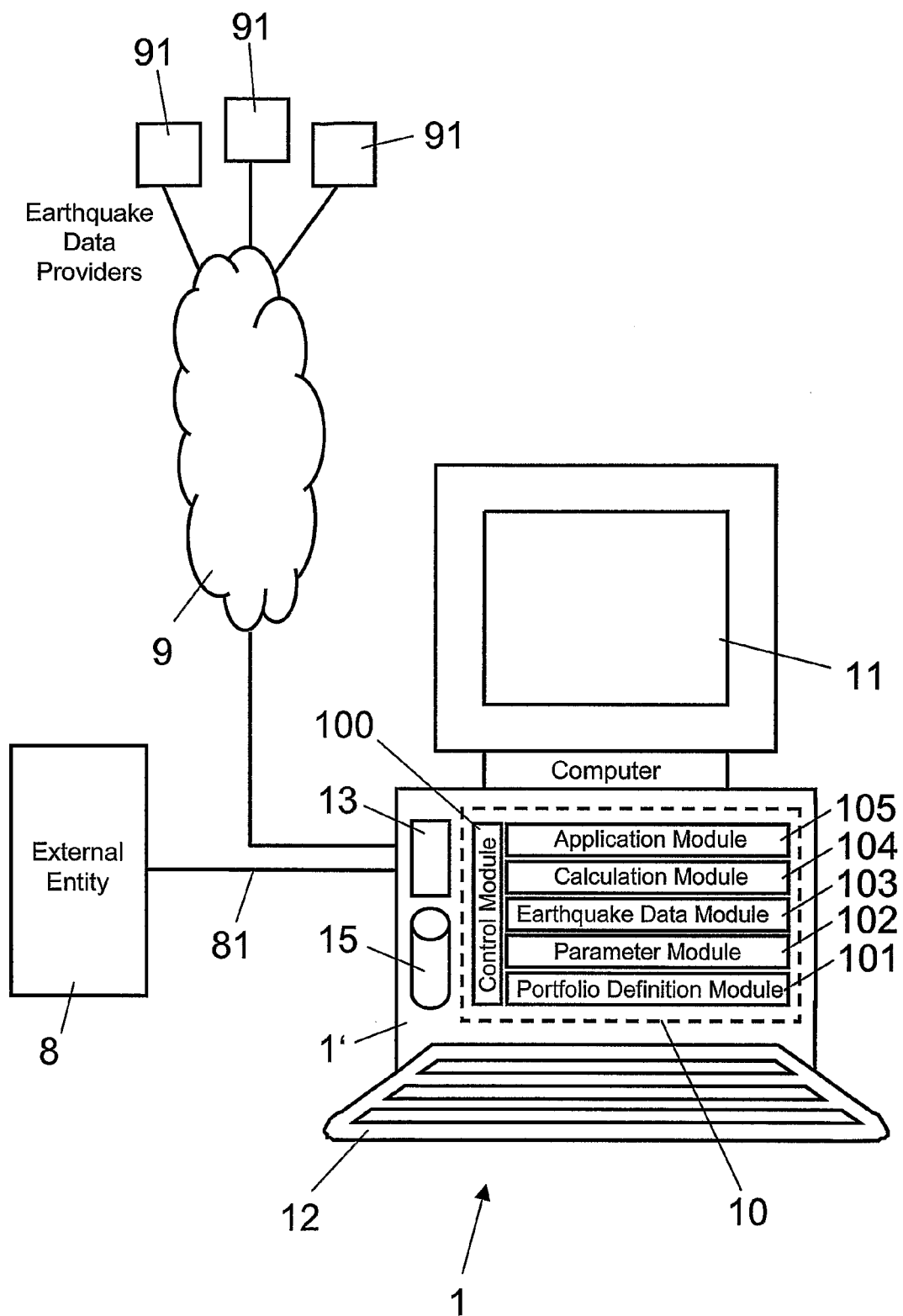
FIG. 1 shows a block diagram illustrating schematically an exemplary configuration of a computer system for practicing embodiments of the present invention, said configuration comprising a computer with a display and data entry means.

In FIG. 1, reference numeral 1 refers to a computer system for determining a damage index indicative of the damage caused by an earthquake to a portfolio (or list) of objects associated with a geographical area. As is illustrated in FIG. 1, the computer system includes a computer 1', connected to a display 11 and to data entry means 12 such as a keyboard and/or a pointing device. The computer 1' is provided with one or more processors and is implemented as a personal computer, for example.

In FIG. 1, reference numeral 10 refers to functional modules of the computer system 1: control module 100, portfolio definition module 101, parameter module 102, earthquake data module 103, calculation module 104, and application module 105. The functional modules 10 are implemented preferably as programmed software modules stored on a computer readable medium, connected fixed or removable to the processor(s) of the computer 1'. One skilled in the art will understand, however, that the functional modules 10 can also be implemented fully or in part by means of hardware.

As is illustrated schematically in FIG. 1, the computer system 1 includes a communication module 13 for exchanging data with earthquake data providers 91 via a telecommunications network 9. The telecommunications network 9 includes a fixed network and/or a mobile radio network. The communication module 13 is also configured to exchange data with an external entity 8, such as a printer, a display, a database, or another computer via communication link 81. Although not illustrated this way, communication link 81 may be part of telecommunications network 9. The computer system also includes a database 15, implemented as a relational database, a spreadsheet or another structured data file.

Figure 2:
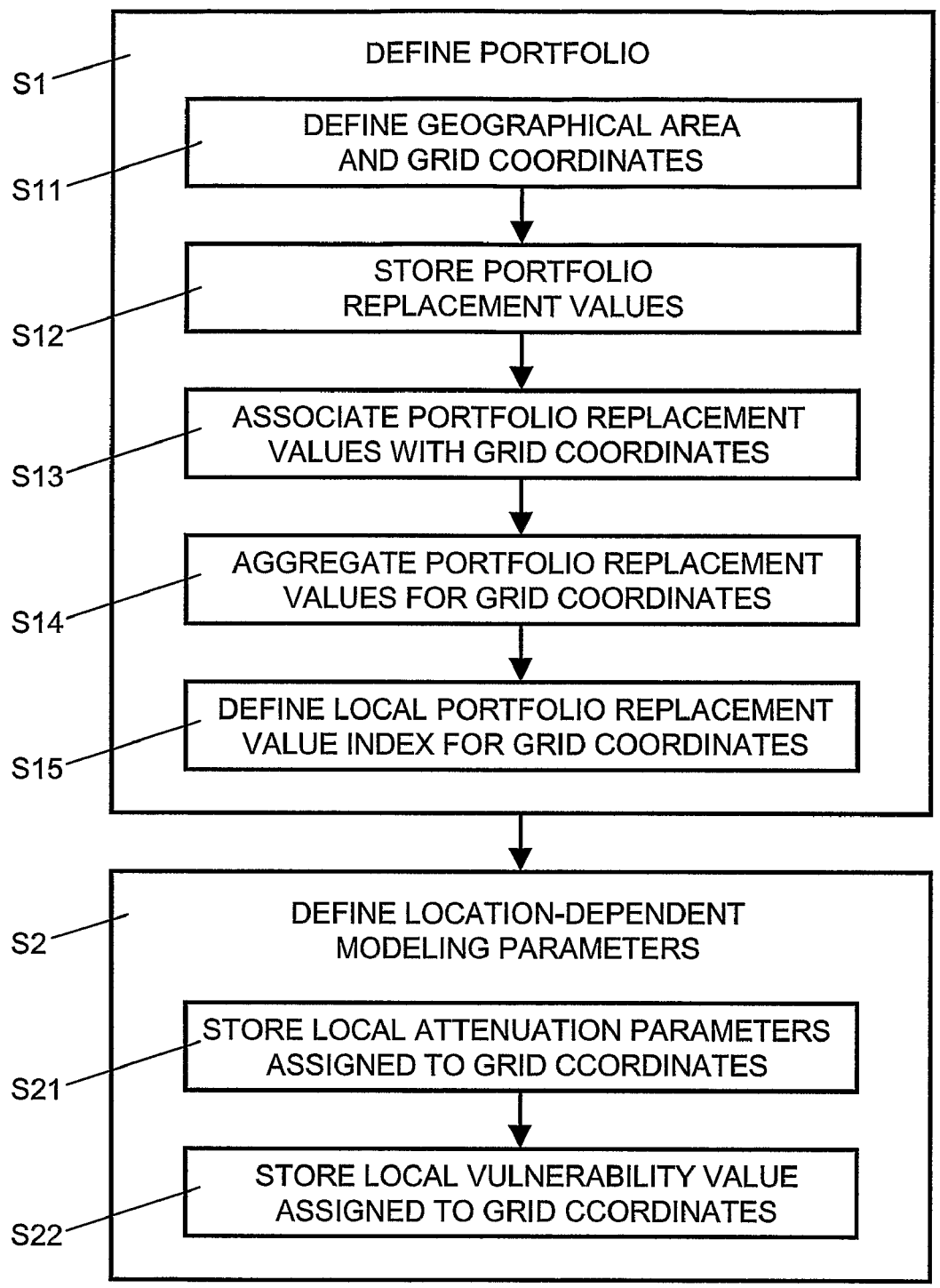
FIG. 2 shows a flow diagram illustrating an example of a sequence of preparatory steps executed according to the present invention for determining an earthquake damage index.
Figure 5:
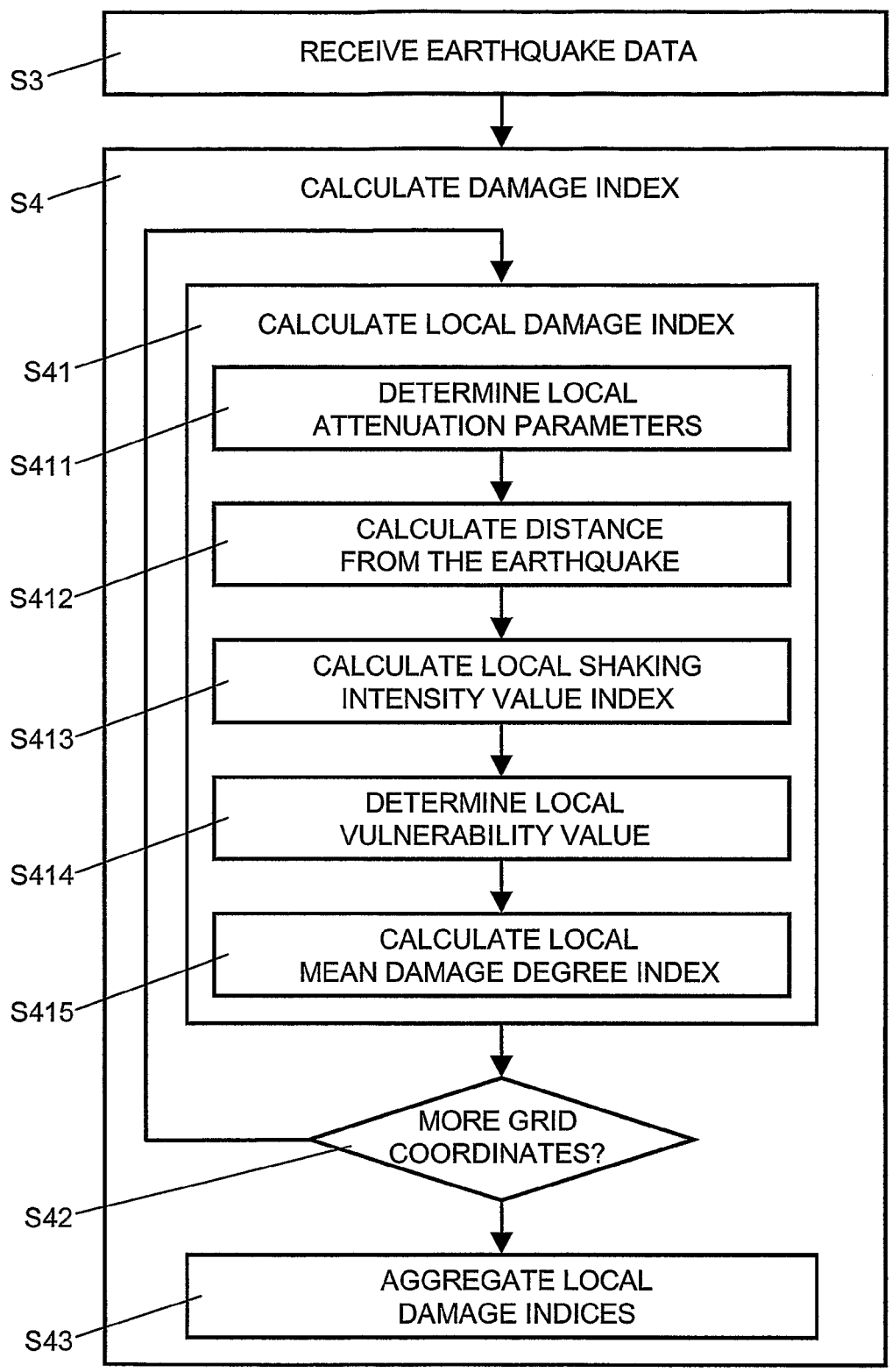
FIG. 5 shows a flow diagram illustrating an example of a sequence of steps executed according to the present invention for determining an earthquake damage index.

The control module 100 is configured to provide to the user of the computer system 1 a user interface for selecting and activating the functional modules 10. The user interface is shown on display 11. Data and control commands are entered by the user using data entry means 12. When selecting the portfolio definition module 101, computer 1' executes step S1 as illustrated in FIG. 2. When selecting the parameter module 102, computer 1' executes step S2 as illustrated in FIG. 2. When selecting the earthquake data module 103, computer 1' executes step S3 as illustrated in FIG. 5. When selecting the calculation module 104, computer 1' executes step S4 as illustrated in FIG. 5. The earthquake data module 103 may trigger automatically execution of calculation module 104.

The portfolio definition module 101 is configured to provide to the user of the computer system 1 a user interface for defining a portfolio (or list) of objects associated with a geographical area. As is illustrated in FIG. 2, in step S1, the portfolio is defined by the user. For example, the portfolio is given an identifier such as a name or a number.

Figure 4:
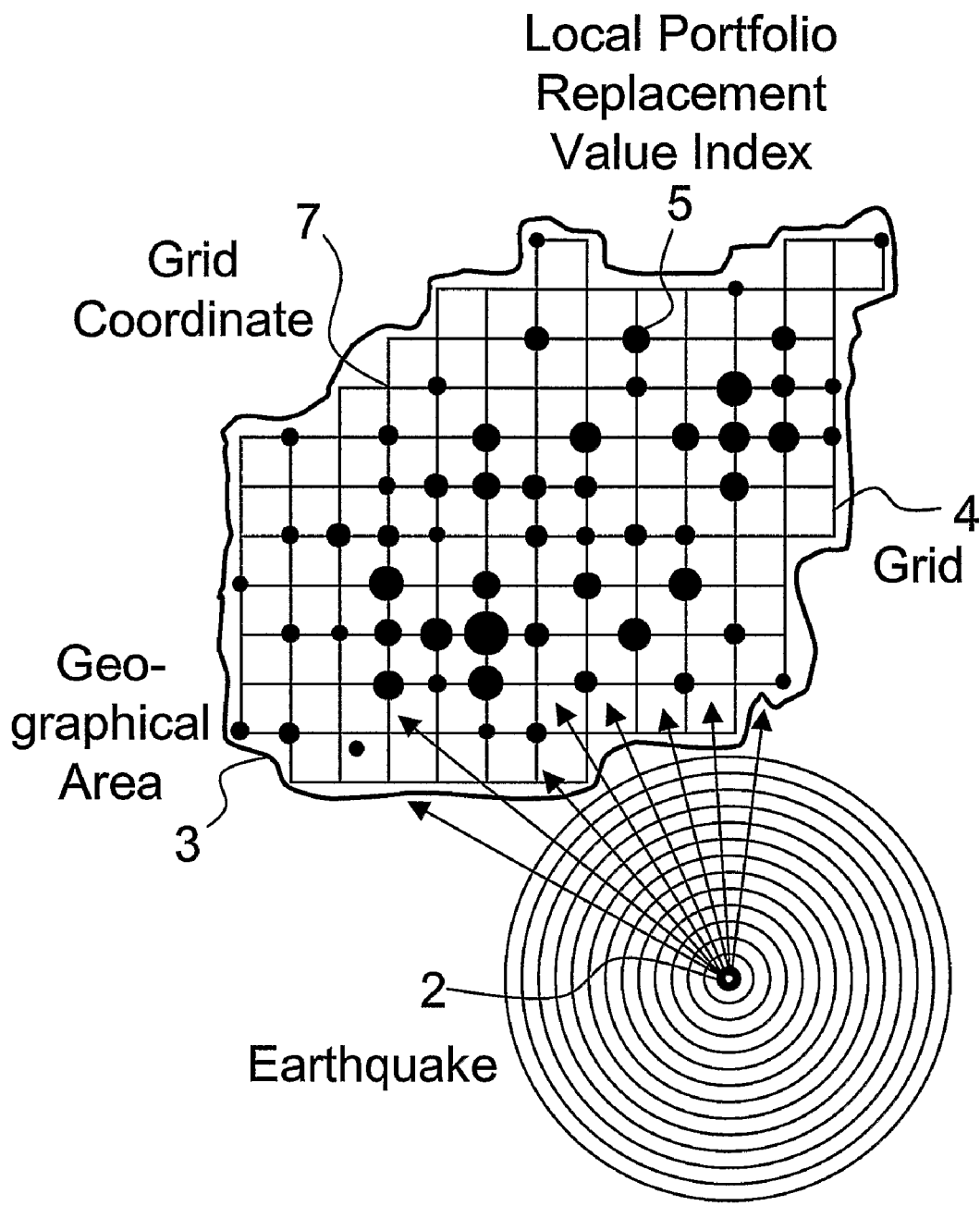
FIG. 4 illustrates an example of a geographical area affected by an earthquake, a grid in the geographical area having local portfolio replacement value indices associated with grid coordinates.

In step S11, the geographical area 3 and a grid 4 to be associated with the geographical area 3 are defined as shown in FIG. 4. For example, the geographical area 3 is defined by selecting a defined geographical region, such as a country, a state, a province or a city, from a list or by specifying the geographical area 3 in a map shown graphically on display 11. The grid is defined by selecting or specifying a grid size S and/or by specifying the location of at least one grid coordinate 7. Parameters defining the geographical area 3 and the grid 4 are stored in database 15 assigned to the portfolio defined in step S1. Although not illustrated in FIG. 4, the grid size does not necessarily need to be of regular resolution, i.e. the grid may have grid elements with different spacing.

In step S12, portfolio replacement values for individual objects to be associated with the portfolio are received from the user and stored in database 15. The portfolio replacement values define an abstract or monetary value of a portfolio object 6. The portfolio replacement values are stored assigned to geographical data defining the geographical location of the portfolio object 6.

Figure 3:
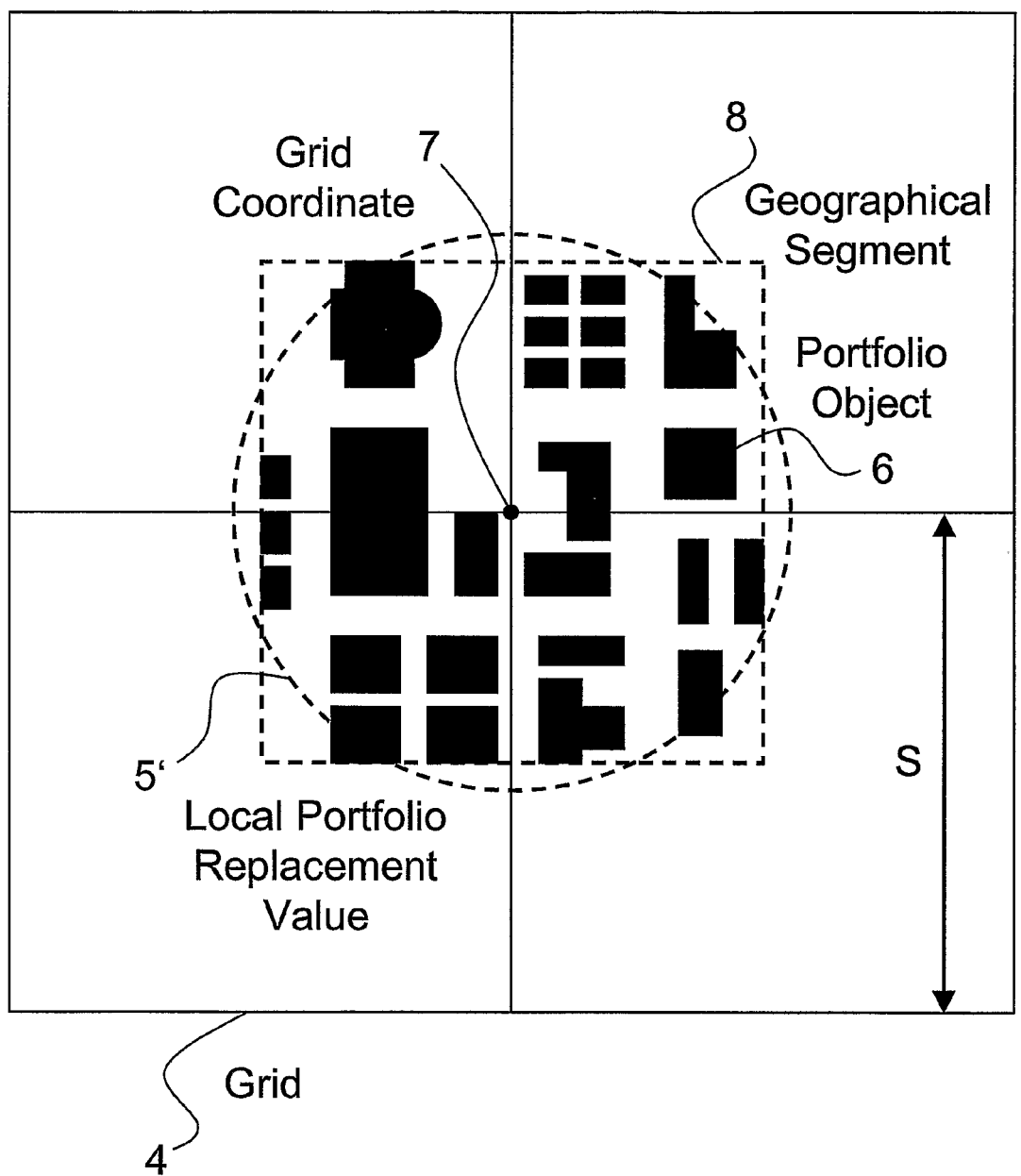
FIG. 3 shows part of a grid of a geographical area and a grid coordinate with associated objects of a portfolio.

In step S13, the portfolio replacement values of the portfolio are associated with grid coordinates 7 based on their assigned geographical data. As is illustrated in FIG. 3, portfolio replacement values are assigned to a grid coordinate 7 based on the proximity of their associated portfolio object 6 to the grid coordinate 7. For example, the portfolio replacement values of all portfolio objects 6 located within a defined geographical segment 8 of a grid coordinate 7 are associated with that grid coordinate 7.

In step S14, for each grid coordinate 7, a local portfolio replacement value 5' is calculated by aggregating the portfolio replacement values associated with the respective grid coordinate 7.

In step S15, for each grid coordinate 7, a local portfolio replacement value index 5 is defined. For example, the local portfolio replacement value index 5 is defined as a ratio of the local portfolio replacement value 5' from the total portfolio replacement value, including the portfolio replacement values of all portfolio objects 6. FIG. 4 shows a graphical representation of the local portfolio replacement value indices 5 associated with the grid coordinates 7 of geographical area 3. The local portfolio replacement value indices 5 are each stored in the database 15 assigned to the respective grid coordinate 7.

In a less preferred variant, steps 13 and 14 are omitted and the local portfolio replacement value indices 5 are based solely on the individual portfolio replacement values associated with the portfolio objects 6 (i.e. the local portfolio replacement value indices are assigned to object coordinates rather than grid coordinates and, subsequently, the calculation described in the following paragraphs is based on object coordinates rather than grid coordinates).

The parameter module 102 is configured to provide to the user of the computer system 1 a user interface for defining location-dependent (seismological) modeling parameters for the geographical area 3. As is illustrated in FIG. 2, the location-dependent modeling parameters are defined by the user in step S2.

In step S21, local (seismological) attenuation parameters are defined for the geographical area 3. The values of the local attenuation parameters are entered by the user or loaded from a data file for individual grid coordinates 7 or for geographical sub-areas, including several adjacent grid coordinates 7. The local attenuation parameters are each stored in the database 15 assigned to the respective grid coordinate 7. Furthermore, in a variant, correction parameters for local subsoil conditions are stored in the database 15 assigned to the respective grid coordinate 7.

In step S22, local (seismological) vulnerability values are defined for the geographical area 3. The local vulnerability values are entered by the user or loaded from a data file for individual grid coordinates 7 or for geographical sub-areas, including several adjacent grid coordinates 7. In a variant, different vulnerability values are defined for different magnitudes of an earthquake. The local vulnerability values are each stored in the database 15 assigned to the respective grid coordinate 7. In an alternative, the vulnerability values are defined through a vulnerability function assigned to the geographical area 3. The vulnerability function returns a vulnerability value for a given grid coordinate 7 and possibly a given magnitude of an earthquake 2.

The earthquake data module 103 is configured to execute step S3. As is illustrated in FIG. 5, in step S3, earthquake data, including location (epicenter), depth and magnitude of a real or simulated (hypothetical) earthquake 2, is received in computer 1'. The earthquake data module 103 is configured to provide to the user of the computer system 1 a user interface for entering the earthquake data with data entry means 12. Alternatively or in addition, earthquake data module 103 is configured to receive the earthquake data from earthquake data providers 91 via telecommunications network 9. The earthquake data providers 91 include seismological measurement stations and/or data centers. The earthquake data is stored in database 15.

The calculation module 104 is configured to calculate in step S4 the damage index for a selected portfolio.

In step S41, a local damage index is calculated for a grid coordinate 7 of the geographical area 3 associated with the portfolio. The local damage index is calculated for grid coordinates 7 having a local portfolio replacement value index 5 assigned to it.

In step S411, the local attenuation parameters (and the correction parameters for local subsoil conditions, if applicable) are determined for the respective grid coordinate 7 from the database 15.

In step S412, calculated is the distance of the respective grid coordinate 7 from the location of earthquake 2, as defined by the earthquake data received in step S3.

In step S413, a local shaking intensity index is calculated for the respective grid coordinate 7. Using the local attenuation parameters (and the correction parameters for local subsoil conditions, if applicable) determined in step S411, the local shaking intensity index is calculated by applying an (seismological) attenuation function to the distance of the respective grid coordinate 7 from earthquake 2, as calculated in step S412, and to the depth and magnitude of earthquake 2, as defined by the earthquake data received in step S3.

For example, the attenuation function in one of its typical forms used by seismologists has the following format:

$$D = \cos(lat1) * \cos(lon1) * \cos(lat2) * \cos(lon2) +$$
$$\cos(lat1) * \sin(lon1) * \cos(lat2) * \sin(lon2) + \sin(lat1) * \sin(lat2)$$
$$Dist = \sqrt{(a \cos(D) * 6378 \text{ km})^2 + Depth^2}$$
$$LocalShakingIntensity = a1 + a2 * \text{Magnitude} - a3 * \ln(Dist) - a4 * Dist$$

Spherical formulas are used for distance calculations (D, Dist). The variables lat1, lon1 and lat2, lon2 refer to the latitude and longitude of the earthquake or the object, respectively. The parameters a1 to a4 in above function are dependent on the geographic region and stem from published academic research on seismology. Depending on the shaking intensity parameter characteristic, the parameterization can be different. Furthermore, the equation can contain additional or modified terms, typically to characterize local geological conditions more appropriately.

In step S414, the local vulnerability value is determined for the respective grid coordinate 7 from database 15 or, alternatively, from a vulnerability function assigned to the geographical area 3.

In step S415, a local mean damage degree index is calculated for the respective grid coordinate 7 from the respective local shaking intensity index, calculated in step S413, and the respective local vulnerability value, determined in step S414. The local mean damage degree index is calculated by multiplying the local shaking intensity index with the local vulnerability value. The local mean damage degree index for the respective coordinate 7 is stored for further processing.

In step S42, it is determined whether or not there are further grid coordinates 7 associated with the geographical area 3 that need a local mean damage degree index to be calculated for. If there are further local mean damage degree indices to be calculated, step S41 is repeated for the remaining grid coordinates. Otherwise, if the local mean damage degree indices have been calculated for all the portfolio's grid coordinates having a local portfolio replacement value index 5 assigned to it, processing continues in step S43.

In step S43, the damage index is calculated for the portfolio by aggregating all the local damage indices calculated in step S41. The damage index is stored in database 15 assigned to the portfolio. Furthermore, the damage index is passed on to application module 105 for further processing.

Application module 105 is configured to execute one or more functions for further processing of the damage index. A simulation function defines different sets of earthquake data for hypothetical earthquakes affecting hypothetically the geographical region 3. For each set, the simulation function stores the damage index assigned to the earthquake data. The simulation function makes it possible to forecast damages estimated for different earthquakes. For purposes of urban planning, at least some of the portfolio objects are only virtual (planned) objects and the simulation function helps to select locations of planned objects with regards to minimum earthquake damage. An interface function transmits the damage index via communication link 81 to external entity 8 for printing, displaying, storing or further processing of the damage index, respectively. A trigger function compares the damage index to a defined threshold value and triggers execution of a further function, if the damage index exceeds the threshold value. For example, the further function is an alarm function activating or displaying alarm indicators, and/or transmitting alarm messages. In the context of a structured financial product, such as an earthquake insurance fund, the portfolio represents a portfolio of assets, for example an insurance portfolio of insured objects, the portfolio replacement values define asset values, for example insured values of portfolio objects, and the local vulnerability values may include adjustments for a deductible. In the example of the insurance fund, a fund index indicates the current value of the insurance fund. The initial value of the fund index, for example a value of 10'000, corresponds to a principle amount invested in the fund, for example a value of $500'000'000 for covering an equivalent value of the portfolio's total replacement value. In the context of the insurance fund, the trigger function triggers deduction of the damage index from the current value of the fund index. Thus, in the present example, a damage index of 50, corresponding to a replacement value of $2'500'000, will result in a current value of the fund index of 9'950, if the threshold value is set lower than 50. At defined accrual dates, the current value of the fund index may be increased by defined interest amounts.

It must be pointed out that different sequences of steps S11 to S15, S21 and S22, as well as S412 to S414 are possible without deviating from the scope of the invention. Consequently, the particular order of steps set forth in the specification should not be construed as limitations on the claims. The foregoing disclosure of the embodiments of the invention has been presented for purposes of illustration and description. It is not intended to be exhaustive or to limit the invention to the precise forms disclosed.

What is claimed is:

1. A computer system for determining a damage index indicative of the damage caused by an earthquake to a portfolio of objects associated with a geographical area, the system comprising:

means for storing local portfolio replacement value indices representing a value of the portfolio of objects, the local portfolio replacement value indices assigned to grid coordinates of a grid covering the geographical area;

means for receiving and storing location, depth and magnitude data associated with the earthquake;

means for calculating a local damage index for each grid coordinate having a local portfolio replacement value index assigned to it, the local damage index being calculated from the location, depth and magnitude data of the earthquake, and from the assigned local portfolio replacement value index; and means for calculating the damage index by aggregating the local damage indices for the grid coordinates, wherein the means for calculating the local damage index is configured to calculate, for each grid coordinate having a local portfolio replacement value index assigned to it, a local shaking intensity value index from the location, depth and magnitude data, a local mean damage degree index from the local shaking intensity value index, and the local damage index from the local mean damage degree index and the local portfolio replacement value index.

2. A computer-implemented method for determining a damage index indicative of the damage caused by an earthquake to a portfolio of objects associated with a geographical area, comprising:

storing local portfolio replacement value indices representing a value of the portfolio of objects, the local portfolio replacement value indices assigned to grid coordinates of a grid covering the geographical area;

receiving location, depth and magnitude data associated with the earthquake;

for each grid coordinate having a local portfolio replacement value index assigned to it, calculating a local damage index from the location, depth and magnitude data of the earthquake, and from the assigned local portfolio replacement value index; and calculating the damage index by aggregating the local damage indices for the grid coordinates, wherein said step of calculating the damage value index further includes calculating, for each grid coordinate having a local portfolio replacement value index assigned to it, a local shaking intensity value index from the location, depth and magnitude data, a local mean damage degree index from the local shaking intensity value index, and the local damage index from the local mean damage degree index and the local portfolio replacement value index.

3. A computer readable medium containing therein computer program code means for controlling a computer such that the computer performs a method including the steps of:

storing, for a portfolio of objects associated with a geographical area, local portfolio replacement value indices representing a value of the portfolio objects, the local portfolio replacement value indices assigned to grid coordinates of a grid covering the geographical area;

receiving and storing location, depth and magnitude data associated with an earthquake;

calculating, for each grid coordinate having a local portfolio replacement value index assigned to it, a local damage index from the location, depth and magnitude data of the earthquake, and from the assigned local portfolio replacement value index; and calculating a damage index, indicative of the damage caused by the earthquake to the portfolio, by aggregating the local damage indices for the grid coordinates, wherein said step of calculating the local portfolio replacement value index further includes calculating, for each grid coordinate having a local damage index assigned to it, a local shaking intensity value index from the location, depth and magnitude data, a local mean damage degree index from the local shaking intensity value index, and the local damage index from the local mean damage degree index and the local portfolio replacement value index.

* * * * *